United States Patent
Ito et al.

(10) Patent No.: US 11,036,045 B2
(45) Date of Patent: Jun. 15, 2021

(54) DISPLAY DEVICE

(71) Applicant: PIONEER CORPORATION, Tokyo (JP)

(72) Inventors: Yuji Ito, Saitama (JP); Manabu Akagi, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 16/493,730

(22) PCT Filed: Mar. 9, 2018

(86) PCT No.: PCT/JP2018/009301
§ 371 (c)(1),
(2) Date: Sep. 12, 2019

(87) PCT Pub. No.: WO2018/168708
PCT Pub. Date: Sep. 20, 2018

(65) Prior Publication Data
US 2020/0018953 A1    Jan. 16, 2020

(30) Foreign Application Priority Data

Mar. 14, 2017 (JP) .............................. JP2017-048832
Mar. 14, 2017 (JP) .............................. JP2017-048833

(51) Int. Cl.
*G09G 5/00* (2006.01)
*G02B 27/01* (2006.01)
(Continued)

(52) U.S. Cl.
CPC .......... *G02B 27/0101* (2013.01); *B60K 35/00* (2013.01); *H04N 5/74* (2013.01)

(58) Field of Classification Search
USPC ............ 345/7, 156, 173, 174, 8, 9; 362/466; 600/178; 353/31; 427/64; 349/147;
(Continued)

(56) References Cited

U.S. PATENT DOCUMENTS 4,706,657 A * 11/1987 Miyagi ................ A61B 1/0669
600/178
8,520,178 B2 * 8/2013 Yamazaki ......... H01L 21/76838
349/147

(Continued)

FOREIGN PATENT DOCUMENTS

JP    2009-248847 A    10/2009
JP    5930231 B2    6/2016
(Continued)

OTHER PUBLICATIONS

International Search Report for related International Application No. PCT/JP2018/009301, dated May 29, 2018; 3 pages.
(Continued)

*Primary Examiner* — Thuy N Pardo
(74) *Attorney, Agent, or Firm* — Procopio, Cory, Hargreaves & Savitch LLP

(57) ABSTRACT

A display device according to the present invention comprises: a light source configured to emit light in a manner capable of changing an emission direction as needed within a predetermined irradiation region; a first screen located in said irradiation region; a first reflective unit disposed closer to said light source than said first screen; a second reflective unit disposed at a position where the light reflected by said first reflective unit reaches; and a second screen disposed at a position where the light reflected by said second reflective unit reaches.

9 Claims, 15 Drawing Sheets

(51) Int. Cl.
  *B60K 35/00* (2006.01)
  *H04N 5/74* (2006.01)
(58) Field of Classification Search
  USPC .......................................................... 348/234
  See application file for complete search history.

(56) References Cited

U.S. PATENT DOCUMENTS

| | | | | |
|---|---|---|---|---|
| 8,916,230 | B2* | 12/2014 | Yamazaki | H01L 21/31105 427/64 |
| 2012/0229776 | A1* | 9/2012 | Nakamura | G03B 21/28 353/31 |
| 2015/0168718 | A1 | 6/2015 | Lee | |
| 2016/0033102 | A1* | 2/2016 | Hiratsuka | G06T 7/70 362/466 |
| 2016/0080625 | A1* | 3/2016 | Itoh | G01J 1/44 348/234 |
| 2016/0089980 | A1* | 3/2016 | Kurahashi | H04N 5/225 345/156 |
| 2016/0124231 | A1 | 5/2016 | Watanabe et al. | |
| 2016/0178902 | A1 | 6/2016 | Ando et al. | |
| 2016/0202479 | A1 | 7/2016 | Okayama et al. | |
| 2016/0202762 | A1* | 7/2016 | Tomaru | B60K 35/00 345/173 |
| 2017/0146803 | A1 | 5/2017 | Kishigami et al. | |
| 2018/0017792 | A1 | 1/2018 | Takazawa et al. | |
| 2018/0340673 | A1* | 11/2018 | Herrmann | F21S 43/239 345/7 |
| 2019/0011843 | A1* | 1/2019 | Shibazaki | G03F 7/7085 345/7 |
| 2019/0080127 | A1* | 3/2019 | Yoshida | G06K 7/1413 345/7 |

FOREIGN PATENT DOCUMENTS

| | | |
|---|---|---|
| JP | 2017015806 A | 1/2017 |
| JP | 2017026951 A | 2/2017 |
| KR | 20130105594 A | 9/2013 |
| WO | 2015/190157 A1 | 12/2015 |
| WO | 2016/117312 A1 | 7/2016 |

OTHER PUBLICATIONS

Extended European Search Report for related EP App. No. 18768282.8 dated Dec. 11, 2020; 8 pages.

Notice of Rejection for related JP App. No. 2019-505975 dated Oct. 20, 2020. English translation provided; 5 pages.

* cited by examiner

DISPLAY DEVICE

CROSS-REFERENCE TO RELATED APPLICATIONS

This application is a U.S. National Stage entry of PCT Application No: PCT/JP2018/009301 filed Mar. 9, 2018, which claims priority to Japanese Patent Application Nos. 2017-048832 and 2017-048833, both filed Mar. 14, 2017, the contents of which are incorporated herein by reference.

TECHNICAL FIELD

The present invention relates to a display device.

BACKGROUND ART

What is called a head-up display has recently started to be installed near a driver's sheet in a vehicle, for example. The head-up display is a display device for displaying images of driving assistance information such as ego vehicle information, traffic information, or navigation information on a light-transmitting display member called an image combiner (hereinafter, also referred to simply as a combiner), for example.

The head-up display displays driving assistance information as described above as a virtual image at a position anterior to a windshield. The driving assistance information is visually recognized by a driver in a manner of being superimposed on a sight ahead of the vehicle. Thus, the head-up display can provide the driving assistance information to the driver while hardly causing a driver's line of sight to move.

Patent Literature 1, for example, discloses a head-up display device including a projection device that outputs projection light toward a first screen and a second screen. Patent Literature 1 also discloses that a path of projection light from the projection device to the first screen is different from a path of projection light from the projection device to the second screen (paragraphs 0020 and 0023, etc.).

CITATION LIST

Patent Literature

Patent Literature 1: Japanese Patent No. 5930231

SUMMARY OF INVENTION

Technical Problem

In the head-up display device as described in Patent Literature 1, a plurality of screens onto which projection light is projected are disposed very close to each other in a direction perpendicular to the optical axis of the projection light (FIG. 1 etc.). Thus, it is highly probable that light diffused on a first screen located frontward on an optical path is more likely to become stray light and reach a second screen. That is, the possibility of the stray light reaching the second screen and generating white mist, or what is called a "black floating" or "impure black" in an image region formed by the second screen can be taken as an example of problems to be solved.

In the head-up display of Patent Literature 1, a distance between the projection device, which is a light source of projection light, and the first screen is different from a distance between the projection device and the second screen. Thus, to take measures to reduce speckle when a laser is used as projection light, a screen design in accordance with the distance between the projection device and each screen, i.e., the imaging distance of projection light, is needed for each of the screens. This can be taken as another example of problems to be solved.

The present invention has been made in view of the foregoing circumstances. An object of the present invention is to provide a display device that projects images on a plurality of screens, capable of improving display quality and increasing flexibility in display modes.

Solution to Problem

The invention described in claim 1 is a display device including: a light source configured to emit light in a manner capable of changing an emission direction as needed within a predetermined irradiation region; a first transmissive screen located in the irradiation region; a first reflective unit disposed closer to the light source than the first transmissive screen; a second reflective unit disposed at a position where the light reflected by the first reflective unit reaches; and a second transmissive screen disposed at a position where the light reflected by the second reflective unit reaches.

DESCRIPTION OF EMBODIMENTS

Embodiments of the present invention will be described below in detail. In the following description, a head-up display (HUD) that uses, for example, a combiner or a windshield of an automobile as a display unit is taken as an example of a display device.

First Embodiment

General Structure

Figure 1:
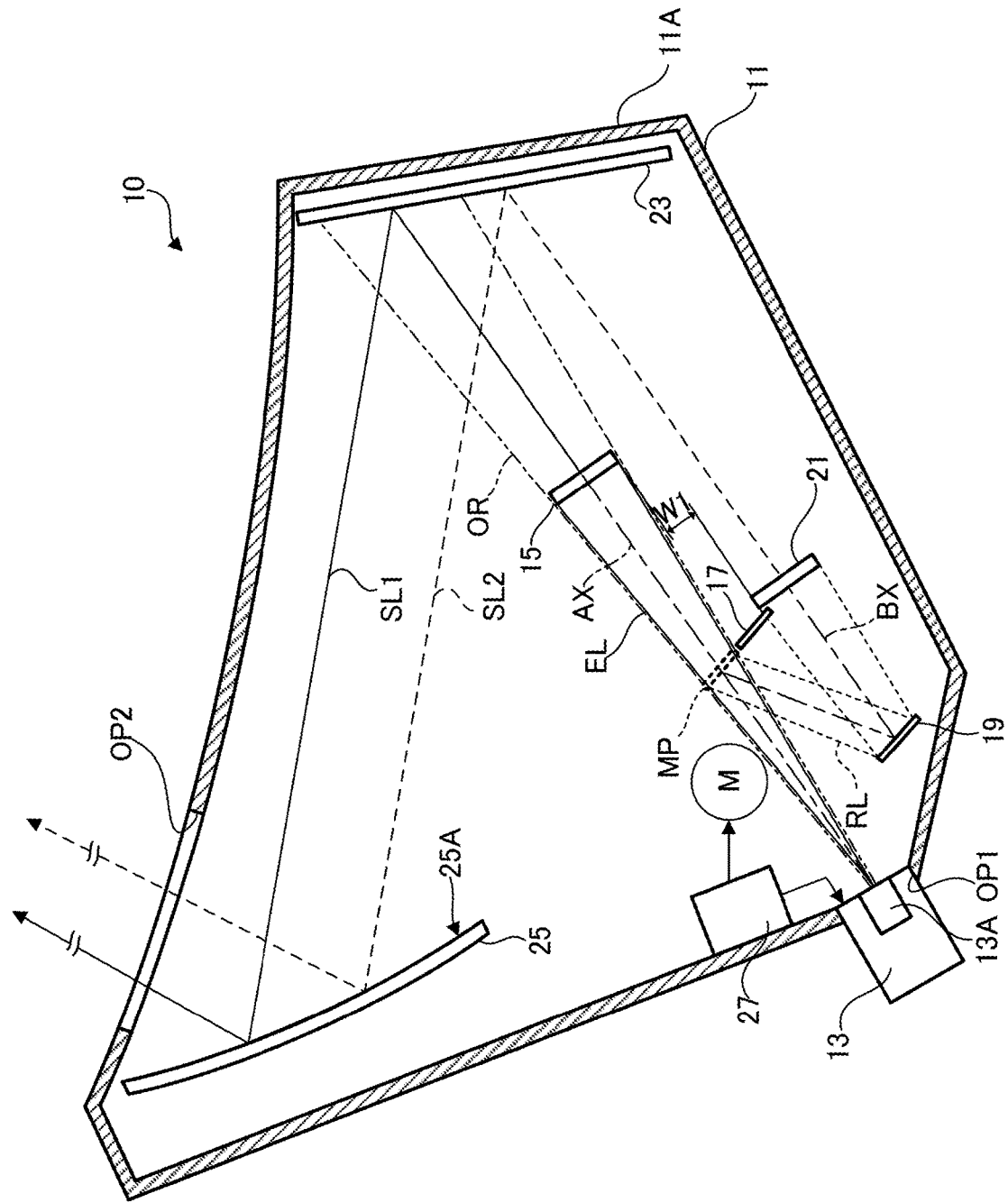
FIG. 1 is a cross-sectional view of a display device according to a first embodiment.
Figure 2:
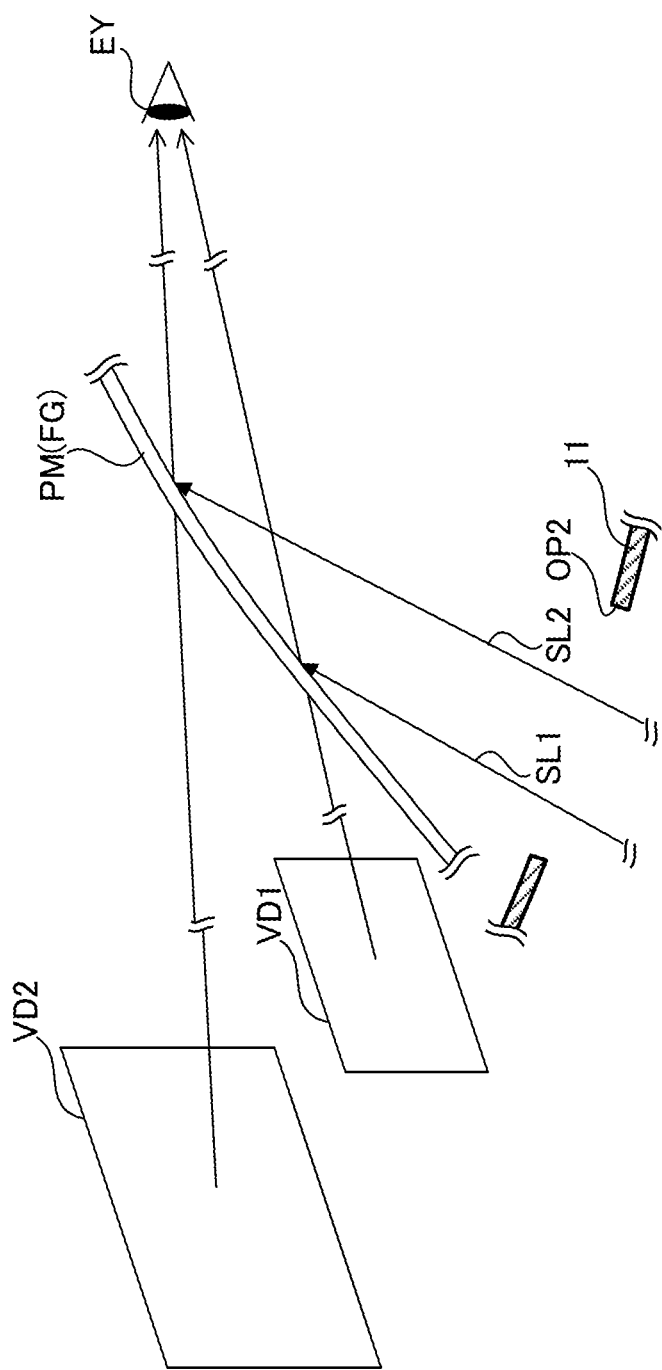
FIG. 2 is a diagram showing an example of a mode in which the display device according to the first embodiment is used to display a virtual image.

With reference to FIGS. 1 and 2, the structure of a display device 10 according to a first embodiment of the present application will be described below. FIG. 1 is a cross-sectional view of the display device 10 according to the first embodiment. FIG. 2 is a diagram showing an example of a mode in which the display device 10 is used to display a virtual image via a windshield of an automobile, for example.

Referring to FIG. 1, a housing 11 is a housing that can house various members therein. The housing 11 is made of a light-blocking material such as a black synthetic resin, for example. Note that the hatching of optical members other than the housing 11 is omitted in FIG. 1 for the sake of clarity in the figure.

A light source 13 is provided in such a manner as to fit into an opening OP1 formed in the housing 11. The light source 13 includes an emitting unit 13A that emits emitted light EL in a portion including a surface facing the interior of the housing 11. The light source 13 is, for example, a laser light source capable of scanning by laser light emitted from the emitting unit 13A, i.e., a laser projector device. The emitted light EL emitted from the emitting unit 13A of the light source 13 is irradiated toward a predetermined irradiation region OR between dashed-two dotted lines in FIG. 1. An optical axis AX is the optical axis of the emitted light EL emitted from the emitting unit 13A of the light source 13.

The following description will be made with a direction toward which the light source 13 emits light being defined as a back side and its opposite direction being defined as a front side.

A first screen 15 is a plate-shaped member provided on the optical axis AX. The first screen 15 is a transmissive screen with a microlens, or the like, that receives the emitted light EL at one of its surfaces facing the light source 13, scatters and diffuses the emitted light EL, and outputs projection light SL1 for displaying an image corresponding to the emitted light EL from the other one of the surfaces. The first screen 15 may include, in place of, or in addition to, the microlens, a holographic diffuser or diffuser plate for scattering the emitted light EL, for example.

Note that the projection light SL1 scattered in the first screen 15 and emitted toward the back side from the first screen is indicated by a single straight line extending in the direction along the optical axis AX for the sake of simplicity in the figure.

In the present embodiment, the first screen 15 is disposed at a position where the first screen 15 can receive the entire emitted light EL from the emitting unit 13A of the light source 13. That is, the one of the surfaces of the first screen 15 is disposed in such a manner as to overlap the irradiation region OR as viewed from the emitting unit 13A. In other words, the first screen 15 is at least partially located within the irradiation region OR.

A first reflecting mirror 17, which serves as a first reflective unit, is a plate-shaped reflective member disposed at a position closer to the light source than the first screen 15 and provided slidably within the housing 11. The first reflecting mirror 17 is a member formed to be capable of reflecting, at its surface, the emitted light EL from the emitting unit 13A. Specifically, the first reflecting mirror 17 is, for example, a member in which a reflective film is formed on a surface of a substrate made of a synthetic resin or a glass material by vapor deposition or the like.

The first reflecting mirror 17 is configured to be capable of a slide movement from a region outside the irradiation region OR into the irradiation region OR, as shown in FIG. 1, by a driving mechanism including a motor M and a slider (not shown) provided in the housing 11, for example. The motor M may be connected to the first reflecting mirror 17 via a transmission mechanism (not shown) such as a gear. When the motor M is driven, the first reflecting mirror 17 makes slide movements to enter the irradiation region OR and retract therefrom, for example.

In FIG. 1, a position of the first reflecting mirror 17 when the first reflecting mirror 17 moves into the irradiation region OR to reflect all of the emitted light EL from the emitting unit 13A is indicated by a broken line as a post-movement position MP. Also, reflected light RL reflected by the first reflecting mirror 17 located at the post-movement position MP is indicated by a broken line. An optical axis BX of the reflected light RL is indicated by an alternate long and short dash line in the figure. Note that a portion of the emitted light EL that is reflected by the first reflecting mirror 17 and a portion of the emitted light EL that reaches the first screen without being reflected by the first reflecting mirror 17 vary depending on an amount of the entry of the first reflecting mirror 17 into the irradiation region OR.

A second reflecting mirror 19, which serves as a second reflective unit, is a plate-shaped reflective member. The second reflecting mirror 19 is a member formed to be capable of reflecting, at its surface, the emitted light EL (the reflected light RL) from the emitting unit 13A. Specifically, the second reflecting mirror 19 is, for example, a member in which a reflective film is formed on a surface of a substrate made of a synthetic resin or a glass material by vapor deposition or the like as with the first reflecting mirror 17.

The second reflecting mirror 19 is disposed at a position where the reflected light RL emitted from the emitting unit 13A and reflected by the first reflecting mirror 17 reaches when the first reflecting mirror 17 is within the irradiation region OR. Also, the second reflecting mirror 19 is oriented so as to reflect the reflected light RL toward the back side.

A second screen 21 is a plate-shaped member provided on the optical axis BX of the reflected light RL. The second screen 21 is disposed on the side toward which the emitted light EL is radiated as viewed from the light source 13. The second screen 21 is a transmissive screen with a microlens, or the like, that receives the emitted light EL (reflected light RL) reflected by the second reflecting mirror 19 at one of its surfaces facing the second reflecting mirror 19, scatters and diffuses the reflected light RL, and outputs projection light SL2 for displaying an image corresponding to the reflected light RL from the other one of the surfaces.

That is, the second screen outputs the projection light SL2 for displaying an image corresponding to the emitted light EL reflected by the first reflecting mirror 17 and the second reflecting mirror 19 to reach the second screen 21. The screen 21 may include, in place of, or in addition to, the microlens, a holographic diffuser or diffuser plate for scattering the emitted light EL, for example. Note that the projection light SL2 scattered in the second screen 21 and outputted toward the back side from the second screen is indicated by a single broken line extending in the direction along the optical axis BX for the sake of simplicity in the figure.

As described above, only the reflected light reflected by the first reflecting mirror reaches the second screen 21. Thus, the reflected light RL irradiated onto the second screen 21 varies depending on an amount of the entry of the first reflecting mirror 17 into the irradiation region OR. When no first reflecting mirror 17 enters the irradiation region OR at all, for example, no reflected light RL is generated. Thus, no reflected light RL is irradiated onto the second screen 21 at all. When the first reflecting mirror 17 is brought into the post-movement position MP, for example, all of the emitted light EL is reflected to be the reflected light RL, the reflected light RL is radiated onto the entire second screen 21, and the projection light SL2 is outputted.

As shown in FIG. 1, the first screen 15 and the second screen 21 in the display device 10 are spaced apart from each other by a width W1 in a direction perpendicular to the optical axis AX of the emitted light EL from the light source 13. Such a separation between the first screen 15 and the second screen 21 prevents the projection light that has been diffused by the second screen from reaching the first screen 15 as stray light. Thus, the display of a blurry virtual image can be prevented from occurring. Moreover, the generation of white mist, or what is called a black floating, over the entire display region of a virtual image can be prevented from occurring.

A turning mirror 23 is a reflective member disposed at a position of a back wall portion 11A of the housing 11 on the back side where the projection light SL1 and the projection light SL2 reach. The turning mirror 23 is a member formed to be capable of reflecting, at its surface, the projection light SL1 and the projection light SL2. Specifically, the turning mirror 23 is, for example, a member in which a reflective film is formed on a surface of a substrate made of a synthetic resin or a glass material by vapor deposition or the like as with the first reflecting mirror 17 and the second reflecting mirror 19.

As shown in FIG. 1, the projection light SL1 and the projection light SL2 having reached the turning mirror 23 are reflected by the turning mirror 23 to travel toward the front side.

A concave mirror 25 is a reflective member provided above the light source 13 and before the turning mirror 23. The concave mirror 25 has a concave surface 25A on a surface facing the turning mirror 23. The concave surface 25A is provided at a position where the projection light SL1 and the projection light SL2 reflected by the turning mirror 23 reach. The projection light SL1 and the projection light SL2 having reached the concave surface 25A are reflected by the concave surface 25A and then outputted toward an upper side through an opening OP2 provided in the housing 11.

A control unit 27 is connected to the motor M, which is driven, as a moving mechanism, to move the first reflecting mirror 17, and the light source 13 to control the operations thereof. The control unit 27 generates an image to be projected onto the first screen 15 or the second screen 21 on the basis of, for example, a state, in particular, a traveling state, of a mobile object, such as an automobile, equipped with the display device 10, and sends image data (data of the image) to the light source 13. On the basis of this image data, the light source 13 emits the emitted light EL including the image from the emitting unit 13A.

As mentioned above, when the motor M is driven, the first reflecting mirror 17 makes slide movements to enter the irradiation region OR or retract therefrom, for example. The control unit 27 can control the motor M to change an amount of the entry of the first reflecting mirror 17 into the irradiation region OR. Such an amount of the entry of the first reflecting mirror can be changed among a plurality of fixed values or steplessly. This amount of the entry of the first reflecting mirror can be generated by the control unit 27 and changed by the image data sent to the light source 13.

FIG. 2 shows an example of a mode in which the display device 10 is used to display a virtual image via a display member PM having a light-transmitting property and capable of generating a virtual image by reflecting the projection light SL1 and the projection light SL2. FIG. 2 describes a case where the display device 10 is disposed in a dashboard of an automobile and the opening OP2 is located in an upper surface of the dashboard. Moreover, the description will be made with a driver's eye being defined as an eyepoint EY, and the direction of the eyepoint EY as viewed from the display member PM being defined as a back side and its opposite direction as a front side.

Note that the display member PM may be a windshield of an automobile. Alternatively, the display member PM may be a plate-shaped, light-transmitting image combiner disposed on a dashboard of an automobile. The following description will be made taking, as an example, a case where the display member PM is a windshield FG of an automobile.

The projection light SL1 and the projection light SL2 outputted from the opening OP2 toward the upper side reach the windshield FG. The projection light SL1 and the projection light SL2 having reached the windshield FG are reflected by the windshield FG. The projection light SL1 reflected by the windshield FG forms, at an anterior position of the windshield FG, a first virtual image VD1 that can be visually recognized from the driver's eyepoint EY. The projection light SL2 reflected by the windshield FG forms, at an anterior position of the windshield FG, a second virtual image VD2 that can be visually recognized from the driver's eyepoint EY.

The projection light SL1 is light from the first screen 15, whereas the projection light SL2 is light from the second screen 21. Thus, the first virtual image VD1 is a virtual image corresponding to the image projected onto the first screen 15 by the light emitted from the emitting unit 13A. The second virtual image VD2 is a virtual image corresponding to the image projected onto the second screen 21 by the light emitted from the emitting unit 13A.

In the present embodiment, the first virtual image VD1 formed by the projection light SL1 from the first screen 15 is seen closer as viewed from the eyepoint EY, and the second virtual image VD2 formed by the projection light SL2 from the second screen 21 is seen farther as viewed from the eyepoint EY as shown in FIG. 2.

The first virtual image VD1 seen closer as viewed from the eyepoint EY can provide two-dimensional display having no stereoscopic effect on a sight as viewed from the driver. The second virtual image VD2 seen farther as viewed from the eyepoint EY, on the other hand, can be superimposed on a sight to provide stereoscopic display by forming the second virtual image VD2 sufficiently away from the windshield FG. Thus, the display provided by the second virtual image VD2 is referred to also as augmented reality (AR) display.

When the first virtual image VD1 and the second virtual image VD2 are formed via the windshield FG as described above, the concave mirror 25 (see FIG. 1) has a function as a magnifier. That is, the concave mirror 25 reflects the projection light SL1 and the projection light SL2 toward the opening OP2 so as to magnify the images included in the projection light SL1 and the projection light SL2 from the first screen 15 and the second screen 21. The reflected projection light SL1 and projection light SL2 then reach the windshield FG.

The concave surface 25A of the concave mirror 25 is formed so that the first virtual image VD1 and the second virtual image VD2 formed by the projection light SL1 and the projection light SL2 having reached the windshield FG can be seen to have appropriate sizes as viewed from the eyepoint EY.

The shape of the concave surface 25A of the concave mirror 25 can be adjusted as appropriate so that the first virtual image VD1 and the second virtual image VD2 formed via the windshield FG are displayed without distortion.

Figure 3:
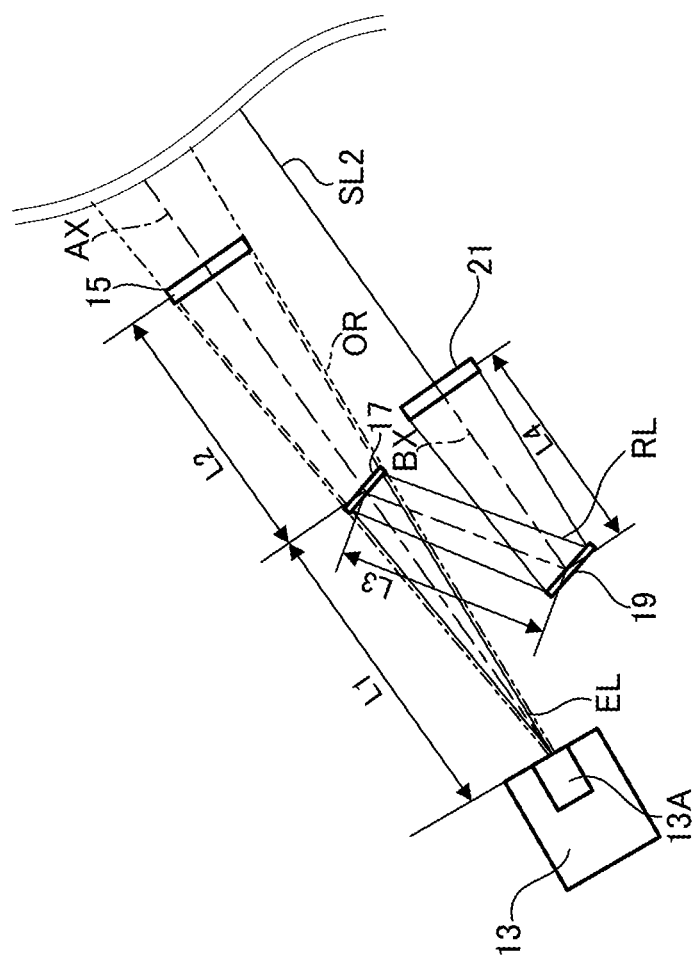
FIG. 3 shows an example of a mode of the arrangement of optical members in the display device according to the first embodiment.

FIG. 3 is a diagram showing a mode of the arrangement of optical members including the light source 13, the first screen 15, the first reflecting mirror 17, the second reflecting mirror 19, and the second screen 21 when the first reflecting mirror 17 is at the post-movement position MP.

When the first reflecting mirror 17 is at the post-movement position MP, a distance between the emitting unit 13A of the light source 13 and the first reflecting mirror is defined as L1, and a distance between the first reflecting mirror 17 and the first screen 15 is defined as L2. Also, a distance between the first reflecting mirror 17 and the second reflecting mirror 19 is defined as L3, and a distance between the second reflecting mirror 19 and the second screen 21 is defined as L4.

In the display device 10, L1+L2=L1+L3+L4. That is, an optical path length of the emitted light EL from the emitting unit 13A to the first screen 15 is equal to an optical path length of the emitted light EL and the reflected light RL from the emitting unit 13A to the second screen 21.

When a laser light source capable of scanning by laser light, for example, is used as a light source, having the same distances between the light source and each of the screens allows laser beams radiated onto the first screen 15 and the second screen 21 to have the same beam spot diameters.

When microlens arrays are used in the first screen 15 and the second screen 21, in particular, having the same beam spot diameters on the first screen 15 and the second screen 21 allows the first screen 15 and the second screen 21 to use the same microlens arrays. Thus, there is no need to design the first screen 15 and the second screen separately. Consequently, the production costs can be reduced.

Operations of Display Device

Figure 4:
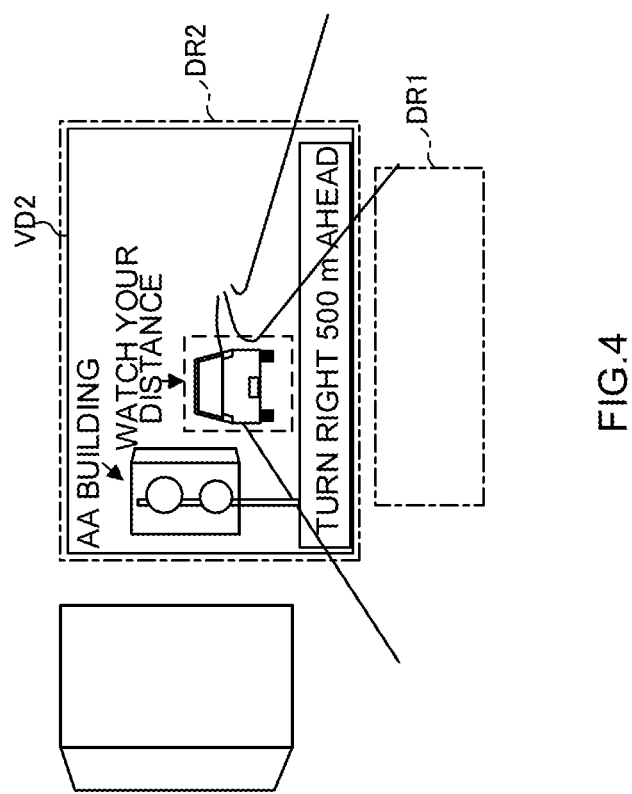
FIG. 4 shows an example of a display mode in the display device of the first embodiment.
Figure 5:
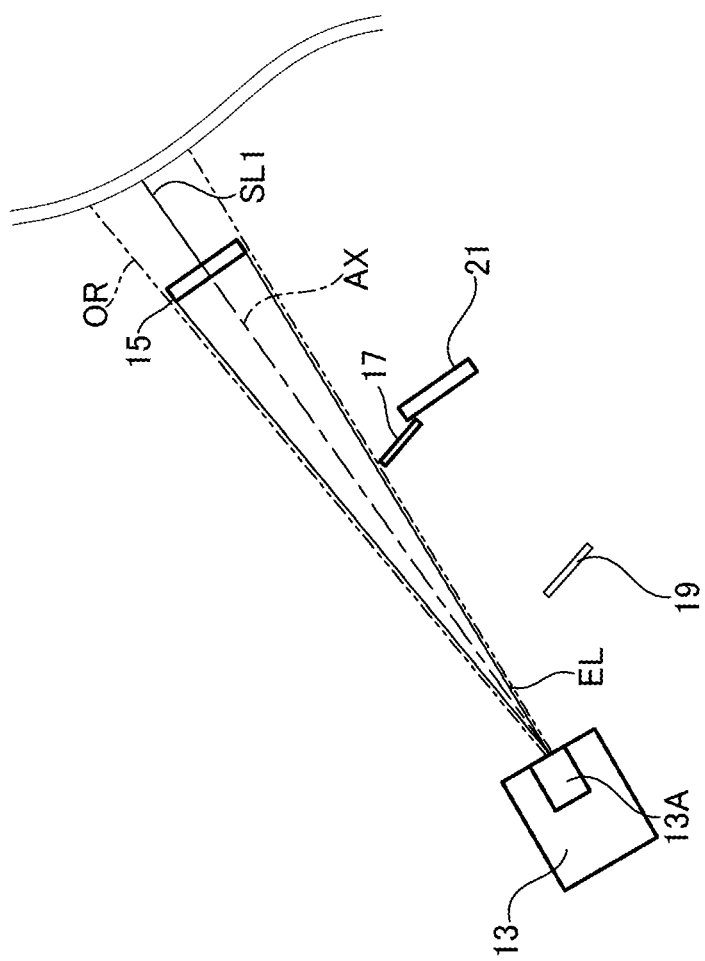
FIG. 5 shows an example of a mode of the arrangement of the optical members in the display device according to the first embodiment.

With reference to FIGS. 3 to 5, operating states of the display device 10 and display modes using virtual images in such operating states will be described below.

When the first reflecting mirror 17 is at the post-movement position MP of FIG. 1 as shown in FIG. 3 described above, all of the emitted light EL from the emitting unit 13A is reflected by the first reflecting mirror 17. That is, no emitted light EL reaches the first screen 15, and all of the emitted light EL (the reflected light RL) reaches the second screen 21 to generate the projection light SL2 corresponding to the emitted light EL. Thus, no first virtual image VD1 of FIG. 2 is generated, and only the second virtual image VD2 is generated.

FIG. 4 shows an example of a virtual image appearing on the windshield when the first reflecting mirror 17 is at the post-movement position MP of FIG. 1. In FIG. 4, a display region DR1 of the first virtual image VD1 and a display region DR2 of the second virtual image VD2 are each indicated by an alternate long and short dash line. When the first reflecting mirror 17 is at the post-movement position MP of FIG. 1, only the projection light SL2 is generated. Thus, only the second virtual image VD2 is displayed.

As described above, the second virtual image VD2 can provide AR display in which the second virtual image VD2 is displayed while being superimposed on a sight. Moreover, when the first reflecting mirror 17 is at the post-movement position MP, the virtual image VD2 can be displayed over the entire surface of the display region DR2, and thus a large display region can be obtained for the AR display provided by the virtual image VD2.

When the second virtual image VD2 is displayed over the entire surface of the display region DR2, a warning such as "Watch distance between cars" for a car ahead, for example, can be displayed while being superimposed on the car ahead or a sight therearound as shown in FIG. 4. Also, a text display indicating the name of a building ahead, for example, can be displayed in a manner corresponding to the position of the building and superimposed on the sight. Also, written navigation information such as "Turn right 500 m ahead" or navigation information via an arrow etc. can be displayed.

Control to bring the first reflecting mirror 17 into the post-movement position MP and cause the light source 13 to generate the emitted light EL including an image to be displayed only in the second virtual image VD2 as shown in FIG. 4 may be performed by the control unit 27 during automated driving of a mobile object such as an automobile, for example. Alternatively, such control may be performed during manual driving of a mobile object traveling at a high speed higher than or equal to a predetermined speed.

FIG. 5 is a diagram showing a mode of the arrangement of optical members including the light source 13, the first screen 15, the first reflecting mirror 17, the second reflecting mirror 19, and the second screen 21 when the first reflecting mirror 17 is brought into a region outside the irradiation region OR, i.e., a position retracted from the irradiation region OR (hereinafter, referred to also as a retracted position).

When the first reflecting mirror 17 is brought into the position retracted from the irradiation region OR, all of the emitted light EL from the emitting unit 13A reaches the first screen 15. That is, no emitted light EL reaches the second screen 21, and all of the emitted light EL reaches the first screen 15 to generate the projection light SL1 corresponding to the emitted light EL. Thus, no second virtual image VD2 of FIG. 2 is generated, and only the first virtual image VD1 is generated.

Figure 6:
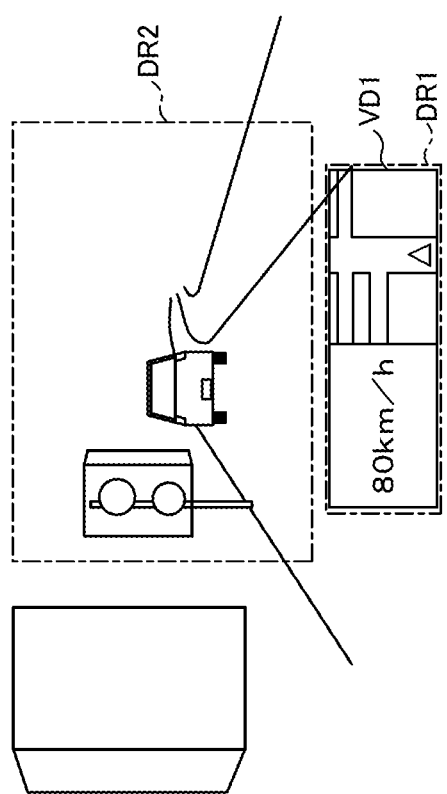
FIG. 6 shows an example of a display mode in the display device according to the first embodiment.

FIG. 6 shows an example of a virtual image appearing on the windshield when the first reflecting mirror 17 is brought into the region outside the irradiation region OR, i.e., the position retracted from the irradiation region OR. In FIG. 6, the display region DR1 of the first virtual image VD1 and the display region DR2 of the second virtual image VD2 are each indicated by an alternate long and short dash line as with FIG. 4. When the first reflecting mirror 17 is brought into the retracted position, only the projection light SL1 is generated. Thus, only the first virtual image VD1 is displayed.

As mentioned above, the first virtual image VD1 can provide two-dimensional display. Moreover, when the first reflecting mirror 17 is at the retracted position, the first virtual image VD1 can be displayed over the entire surface of the display region DR1, and thus a large display region can be obtained for the two-dimensional display provided by the first virtual image VD1.

When the first virtual image VD1 is displayed over the entire surface of the display region DR1, information such as that displayed on an instrument panel (e.g., a speed) is displayed as shown in FIG. 6, for example. Also, map information or the like can be displayed in the remaining region.

Control to bring the first reflecting mirror 17 into the retracted position and cause the light source 13 to generate the emitted light EL including an image to be displayed only in the first virtual image VD1 as shown in FIG. 6 may be performed by the control unit 27 while a mobile object such as an automobile is halting, for example.

Figure 7:
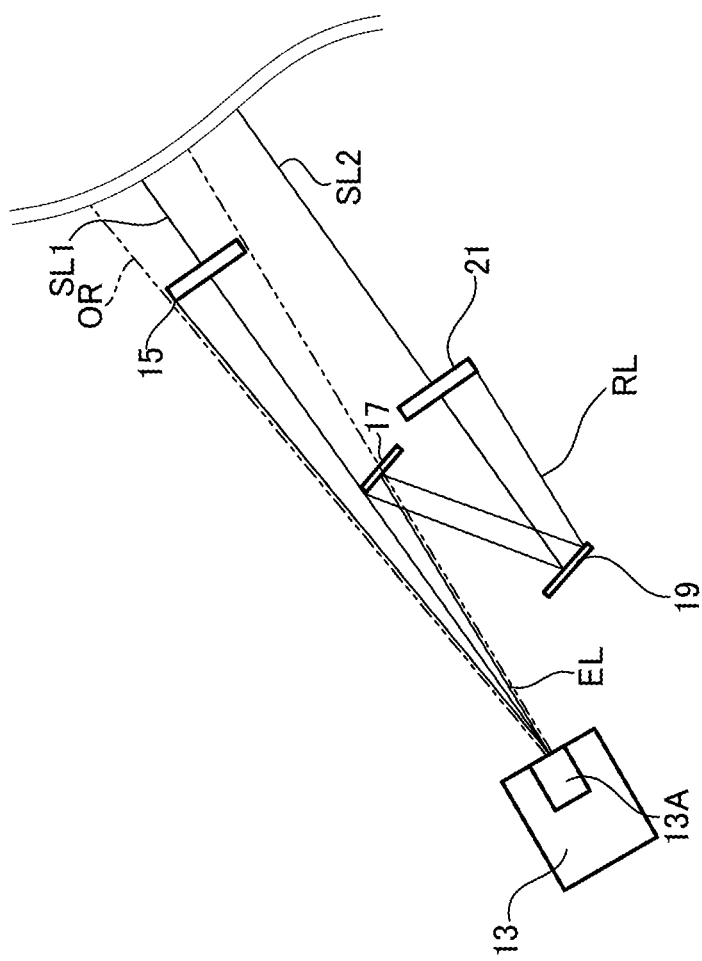
FIG. 7 shows an example of a mode of the arrangement of the optical members in the display device according to the first embodiment.

FIG. 7 is a diagram showing a mode of the arrangement of the light source 13, the first screen 15, the first reflecting mirror 17, the second reflecting mirror 19, and the second screen 21 when the first reflecting mirror 17 is brought into a position at which the first reflecting mirror 17 enters about a half of the irradiation region OR (hereinafter, referred to also as a half-entry position).

When the first reflecting mirror 17 is brought into the half-entry position, the lower half of the emitted light EL from the emitting unit 13A is reflected by the first reflecting mirror 17 and the upper half thereof reaches the first screen 15. That is, the lower half of the emitted light EL reaches the second screen 21. Thus, the projection light SL1 corresponding to the upper half of the emitted light EL is generated by the first screen 15, and the projection light SL2 corresponding to the lower half of the emitted light EL is generated by the second screen 21. Thus, no second virtual image VD2 of FIG. 2 is generated, and only the first virtual image VD1 is generated.

Figure 8:
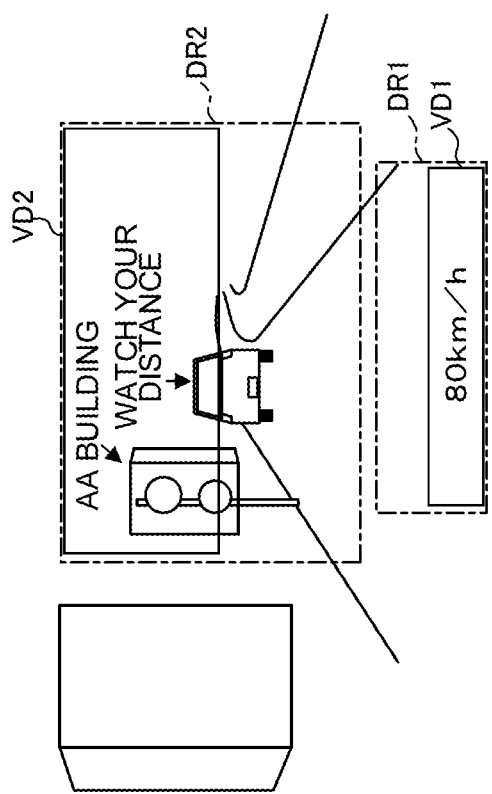
FIG. 8 shows an example of a display mode in the display device according to the first embodiment.

FIG. 8 shows an example of a virtual image appearing on the windshield when the first reflecting mirror 17 is brought into the half-entry position. In FIG. 8, the display region DR1 of the first virtual image VD1 and the display region DR2 of the second virtual image VD2 are each indicated by an alternate long and short dash line as with FIGS. 4 and 6. When the first reflecting mirror 17 is brought into the half-entry position, the projection light SL1 and the projection light SL2 are generated. The first virtual image VD1 is displayed at the lower half of the display region DR1, whereas the second virtual image VD2 is displayed at the upper half of the display region DR2.

As mentioned above, the first virtual image VD1 can provide two-dimensional display. The second virtual image VD2, on the other hand, can provide AR display. In other words, both of the two-dimensional display provided by the first virtual image VD1 and the AR display provided by the second virtual image VD2 can be achieved simultaneously when the first reflecting mirror 17 is brought into the half-entry position.

As shown in FIG. 8, only information such as that displayed on an instrument panel (e.g., a speed), for example, may be displayed in the display region DR1 via the first virtual image VD1 when the first reflecting mirror 17 is brought into the half-entry position. Also, AR display superimposed on a sight can be provided in the display region DR2 by using the second virtual image VD2.

Note that the concave mirror 25 may be configured to be rotatable about an axis perpendicular to the plane of paper in FIG. 1. This can move the display positions of the first virtual image VD1 and the second virtual image VD2 in the up or down direction.

For example, although the second virtual image VD2 is displayed in the upper region of the display region DR2 in FIG. 8, rotating the concave mirror 25 can move the second virtual image VD2 downwardly. Also, the first virtual image VD1 can be moved further downwardly. When a mobile object, such as an automobile, equipped with the display device 10 is traveling at a medium-to-low speed in an urban area, for example, the disturbance of the instrument panel display provided by the first virtual image VD1 can be mitigated by moving the positions of the first virtual image VD1 and the second virtual image VD2 downwardly.

As just described, the display device 10 can change a region where the two-dimensional display is provided by the first virtual image VD1 and a region where the AR display is provided by the second virtual image VD2 as needed by causing the first reflecting mirror 17 to slide. Thus, the display device 10 can display information in a flexible manner while changing a ratio between the two-dimensional display and the AR display with the simple mechanism and structure.

Routine for Changing Display Modes

Figure 9:
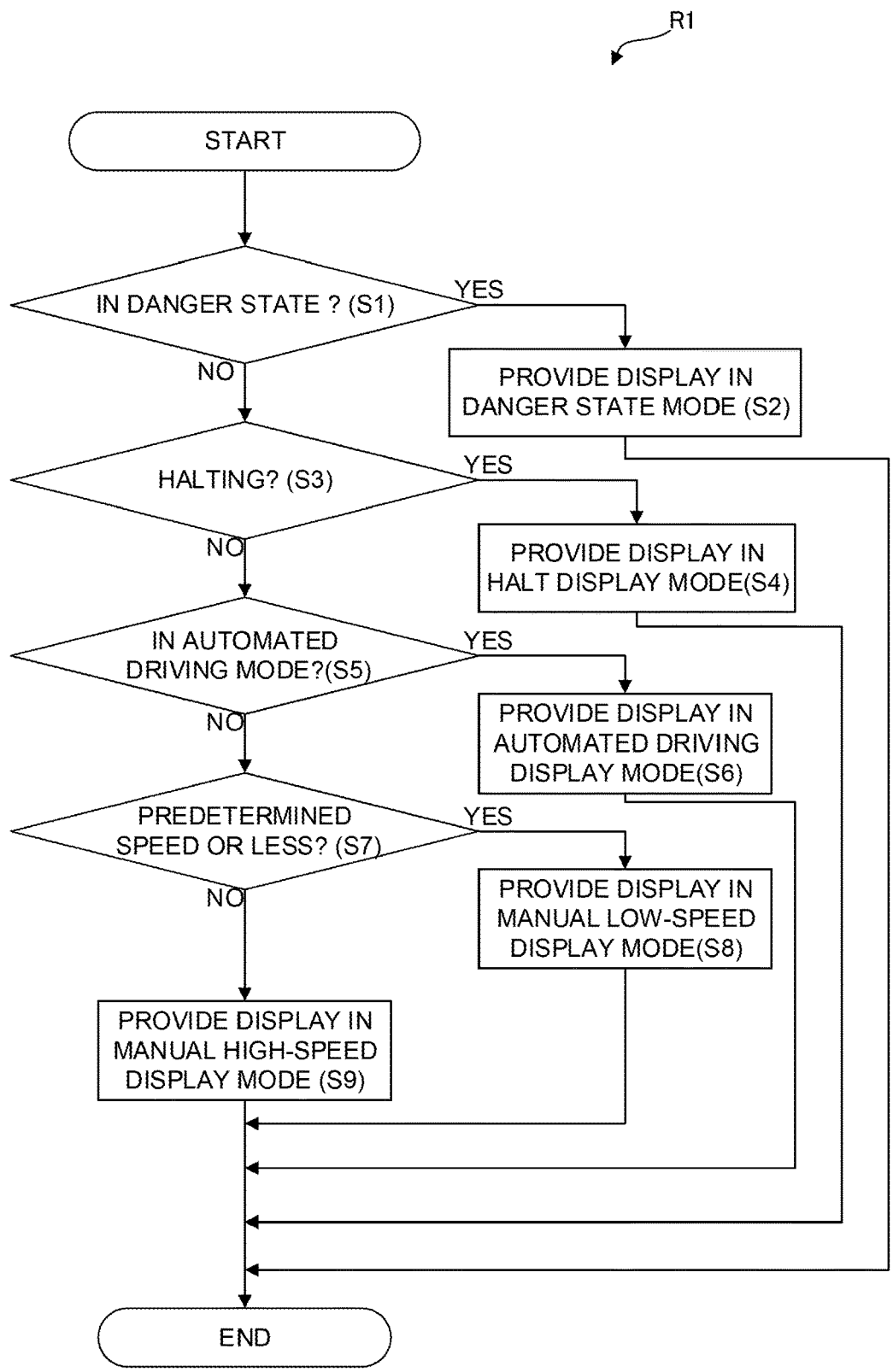
FIG. 9 shows an example of a routine for changing display modes in the display device according to the first embodiment.

FIG. 9 shows a routine R1 for changing display modes, which is executed by the control unit 27 of the display device 10. A change of a display mode is performed by driving the first reflecting mirror 17. The following description will be made taking, as an example, a case where the display device 10 is installed in an automobile.

The routine R1 for changing display modes is started when power is supplied to the display device 10 by turning ON an ACC power of an automobile, for example.

Once the routine R1 for changing display modes is started, the control unit 27 determines if the automobile is in a danger state (step S1). Such a determination is made, with a camera or a radar installed in an automobile (hereinafter referred to as an ego vehicle) equipped with the display device 10, for example, on the basis of whether an object such as other car approaching the ego vehicle at a speed higher than or equal to a predetermined speed or an obstacle exists.

If it is determined in the step S1 that the ego vehicle is in a danger state (the step S1: YES), the control unit 27 drives the first reflecting mirror so as to provide display in a danger state mode, and sends a display image corresponding to the danger display mode to the light source 13 (step S2). In the danger state display mode, the first reflecting mirror 17 may be brought into the post-movement position MP (see FIG. 1) as shown in FIG. 3. That is, the entire display region DR2 can be used for the AR display provided by the second virtual image VD2 as shown in FIG. 4 in order to facilitate the notification of a danger to a driver.

If it is determined in the step S1 that the ego vehicle is not in a danger state (the step S1: NO), the control unit 27 determines if the ego vehicle is halting (step S3). Such a determination may be made on basis of information on a speed that can be acquired by the ego vehicle, e.g., a vehicle speed pulse, an acceleration measurement value, or GPS information.

If it is determined in the step S3 that the ego vehicle is halting (the step S3: YES), the control unit 27 drives the first reflecting mirror so as to provide display in a halt state mode, and sends a display image corresponding to the halt display mode to the light source 13 (step S4). In the halt display mode, the first reflecting mirror 17 may be brought into the retracted position as shown in FIG. 5. That is, the entire display region DR1 can be used for the two-dimensional display provided by the first virtual image VD1 as shown in FIG. 6 to provide only the two-dimensional display to a driver.

If it is determined in the step S3 that the ego vehicle is not halting (the step S3: NO), the control unit 27 determines if the ego vehicle is in an automated driving mode (step S5).

If it is determined in the step S5 that the ego vehicle is in the automated driving mode (the step S5: YES), the control unit 27 drives the first reflecting mirror so as to provide display in an automated driving display mode, and sends a display image corresponding to the automated driving display mode to the light source 13 (step S6). In the automated driving display mode, the first reflecting mirror 17 may be in the whole-entry state as shown in FIG. 3. That is, the entire display region DR2 can be used for the AR display provided by the second virtual image VD2 as shown in FIG. 4 in order to facilitate the notification of information on the forward view of the ego vehicle to a driver.

If it is determined in the step S5 that the ego vehicle is not in the automated driving mode (the step S5: NO), the control unit 27 determines if the ego vehicle is at a speed lower than or equal to a predetermined speed (step S7). If it is determined in the step S7 that the ego vehicle is at a speed lower than or equal to the predetermined speed (e.g., 30 km/h) (the step S7: YES), the control unit 27 drives the first reflecting mirror so as to provide display in a low-speed driving display mode, and sends a display image corresponding to the low-speed driving display mode to the light source 13 (step S8).

In the low-speed driving display mode, the first reflecting mirror 17 may be brought into the half-entry position as shown in FIG. 7. That is, to notify a driver of information on the forward view of the ego vehicle as well as instrument panel information, or the like, via two-dimensional display, part of the display region DR1 is used for the two-dimensional display provided by the first virtual image VD1 and part of the display region DR2 is used for the AR display provided by the second virtual image VD2 as shown in FIG. 8.

If it is determined in the step S7 that the ego vehicle is not at a speed lower than or equal to the predetermined speed, the control unit 27 drives the first reflecting mirror so as to provide display in a high-speed driving display mode, and sends a display image corresponding to the high-speed driving display mode to the light source 13 (step S9). In the high-speed driving display mode, the first reflecting mirror 17 may be brought into the post-movement position MP (see FIG. 1) as shown in FIG. 3. That is, the entire display region DR2 can be used for the AR display provided by the second virtual image VD2 as shown in FIG. 4 in order to facilitate the notification of information on the forward view of the ego vehicle to a driver.

The display device 10 of the first embodiment described above can prevent the display of a blurry virtual image by separating the first screen 15 and the second screen 21 from each other. Moreover, the generation of white mist, or what is called a black floating, over the entire display region of a virtual image can be prevented from occurring.

Moreover, the display device 10 of the first embodiment eliminates the need to design the first screen 15 and the second screen separately by having the same distances between the light source and each of the screens. Consequently, the production costs can be reduced.

Moreover, the display device 10 of the first embodiment can display information in a flexible manner while changing a ratio between two-dimensional display and AR display with the simple mechanism and structure of the first reflecting mirror 17 capable of making slide movements.

Although the aforementioned first embodiment has described the case where the first reflecting mirror 17 is slidable, the first reflecting mirror 17 may be rotatable about a rotation axis parallel to the plane of paper in FIG. 1. This can change the position of the emitted light EL (reflected light RL) irradiated onto the second screen 21 in a direction perpendicular to the plane of paper, thereby changing the generation position of the second virtual image VD2 in a left or right direction (horizontal direction) in FIG. 4.

Second Embodiment

Figure 10:
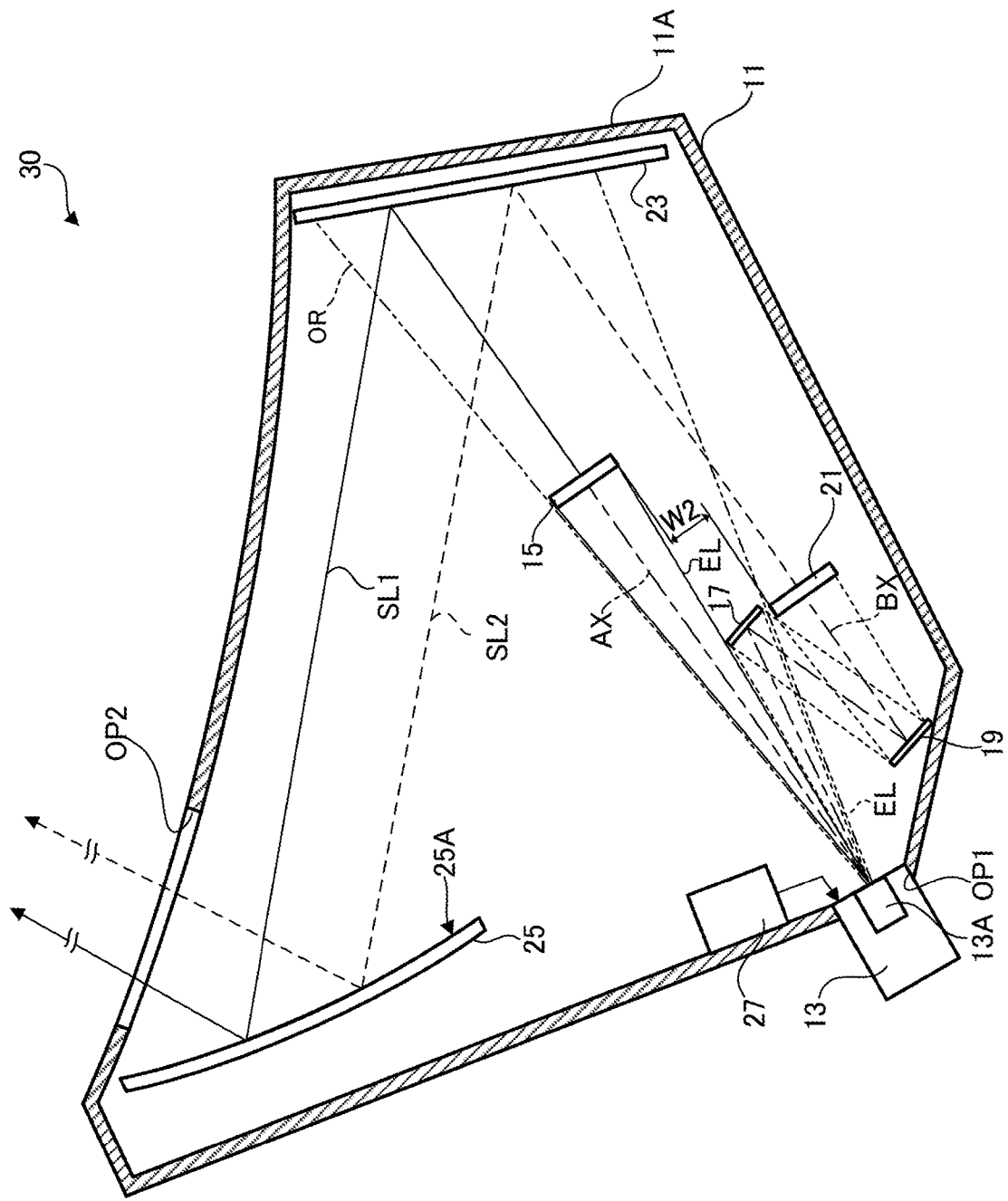
FIG. 10 is a cross-sectional view of a display device according to a second embodiment.

With reference to FIG. 10, a display device 30 of the second embodiment will be described below. In the following description, elements corresponding to the display device 10 of the first embodiment will be denoted by the same reference numerals.

Referring to FIG. 10, a housing 11 is a housing that can house various members therein. The housing 11 is made of a light-blocking material such as a black synthetic resin, for example. Note that the hatching of optical elements other than the housing 11 is omitted in FIG. 10 for the sake of clarity in the figure.

A light source 13 is provided in such a manner as to fit into an opening OP1 provided in the housing 11. The light source 13 includes an emitting unit 13A that emits emitted light EL in a portion including a surface facing the interior of the housing 11. The light source 13 is, for example, a laser light source capable of scanning by laser light emitted from the emitting unit 13A. The emitting unit 13A can irradiate the emitted light EL within a predetermined angular range toward a predetermined irradiation region OR between dashed-two dotted lines in FIG. 10. The emitting unit 13A is configured in such a manner that an optical axis AX of the emitted light EL is rotatable about an axis perpendicular to the plane of paper around the emitting unit 13A. That is, the emitting unit 13A can emit, toward the irradiation region OR, light with a predetermined irradiation angle about the axis perpendicular to the plane of paper, and can change the optical axis AX of the light.

The following description will be made with a direction toward which the light source 13 emits light being defined as a back side and its opposite direction being defined as a front side.

A first screen 15 is a plate-shaped member provided in the irradiation region OR. As with the display device 10 of the first embodiment, the first screen 15 is a transmissive screen with a microlens, or the like, that receives the emitted light EL at one of its surfaces facing the light source 13, scatters and diffuses the emitted light EL, and outputs projection light SL1 for displaying an image corresponding to the emitted light EL from the other one of the surfaces. The first screen 15 may include, in place of, or in addition to, the microlens, a holographic diffuser or diffuser plate for scattering the emitted light EL, for example.

FIG. 10 shows a case where the emitted light EL is emitted so that the optical axis AX passes through the center of the first screen 15. Note that the projection light SL1 scattered in the first screen 15 and outputted toward the back side from the first screen is indicated by a single straight line along the optical axis AX for the sake of simplicity in the figure.

In the present embodiment, the first screen 15 is disposed in an upper region of the irradiation region OR as viewed from the emitting unit 13A. In other words, the first screen 15 is at least partially located within the irradiation region OR.

A first reflecting mirror 17 is a plate-shaped reflective member provided in the irradiation region OR. The first reflecting mirror 17 is a member formed to be capable of reflecting, at its surface, the emitted light EL from the emitting unit 13A. Specifically, the first reflecting mirror 17 is, for example, a member in which a reflective film is formed on a surface of a substrate made of a synthetic resin or a glass material by vapor deposition or the like.

The first reflecting mirror 17 is disposed in a lower region of the irradiation region OR as viewed from the emitting unit 13A. In other words, the first reflecting mirror 17 is at least partially located within the irradiation region OR. Also, the first reflecting mirror 17 is disposed in such a manner as not to overlap the first screen 15 as viewed from the emitting unit 13A.

In FIG. 10, the emitted light EL emitted so as to be totally reflected by the first reflecting mirror 17 is indicated by broken lines. Note that a portion of the emitted light EL that is reflected by the first reflecting mirror 17 and a portion of the emitted light EL that reaches the first screen without being reflected by the first reflecting mirror 17 vary depending on which region of the irradiation region OR the emitted light is irradiated to due to a change in the optical axis AX of the emitted light EL.

A second reflecting mirror 19 is a plate-shaped reflective member. The second reflecting mirror 19 is a member formed to be capable of reflecting, at its surface, the emitted light EL from the emitting unit 13A. Specifically, the second reflecting mirror 19 is, for example, a member in which a reflective film is formed on a surface of a substrate made of a synthetic resin or a glass material by vapor deposition or the like as with the first reflecting mirror 17.

The second reflecting mirror 19 is disposed at a position where the emitted light EL emitted from the emitting unit 13A and reflected by the first reflecting mirror 17 reaches when the emitted light EL is irradiated onto the first reflecting mirror 17. Also, the second reflecting mirror 19 is oriented so as to reflect the emitted light EL toward the back side.

A second screen 21 is a plate-shaped member disposed at a position where the emitted light EL reflected by the first reflecting mirror 17 and the second reflecting mirror 19 reaches. The second screen 21 is a transmissive screen with a microlens, or the like, that receives the emitted light EL reflected by the second reflecting mirror at one of its surfaces facing the second reflecting mirror 19, scatters and diffuses the emitted light, and outputs projection light SL2 for displaying an image corresponding to the emitted light EL from the other one of the surfaces.

That is, the second screen 21 outputs the projection light SL2 for displaying an image corresponding to the emitted light EL reflected by the first reflecting mirror 17 and the second reflecting mirror 19 to reach the second screen 21. The screen 21 may include, in place of, or in addition to, the microlens, a holographic diffuser or diffuser plate for scattering the emitted light EL, for example. Note that the projection light SL2 scattered in the second screen 21 and outputted toward the back side from the second screen is indicated by a single broken line for the sake of simplicity in the figure.

As described above, only the reflected light reflected by the first reflecting mirror 17 reaches the second screen 21. Thus, the emitted light EL irradiated onto the second screen 21 varies depending on an angle of the optical axis AX of the emitted light EL. That is, the emitted light EL irradiated onto the second screen 21 varies depending on an area of the first reflecting mirror 17 over which the emitted light EL is irradiated. When no emitted light EL is irradiated onto the first reflecting mirror 17, for example, no emitted light EL is irradiated onto the second screen 21. When the emitted light EL is radiated over the entire surface of the first reflecting mirror 17, for example, all of the emitted light EL is irradiated over the entire second screen 21 and the projection light SL2 is outputted.

As shown in FIG. 10, the first screen 15 and the second screen 21 in the display device 30 are spaced apart from each other by a width W2 in a direction perpendicular to the optical axis AX of the emitted light EL from the light source 13. Such a separation between the first screen 15 and the second screen 21 prevents the projection light that has been diffused by the second screen from reaching the first screen 15 as stray light. Thus, the display of a blurry virtual image can be prevented from occurring. Moreover, the generation of white mist, or what is called a black floating, over the entire display region of a virtual image can be prevented from occurring.

A turning mirror 23 is a reflective member disposed at a position of a back wall portion 11A of the housing 11 on the back side where the projection light SL1 and the projection light SL2 reach. The turning mirror 23 is a member formed to be capable of reflecting, at its surface, the projection light SL1 and the projection light SL2. Specifically, the turning mirror 23 is, for example, a member in which a reflective film is formed on a surface of a substrate made of a synthetic resin or a glass material by vapor deposition or the like as with the first reflecting mirror 17 and the second reflecting mirror 19.

As shown in FIG. 10, the projection light SL1 and the projection light SL2 having reached the turning mirror 23 are reflected by the turning mirror 23 to travel toward the front side.

A concave mirror 25 is a reflective member provided above the light source 13 and before the turning mirror 23. The concave mirror 25 has a concave surface 25A on a surface facing the turning mirror 23. The concave surface 25A is provided at a position where the projection light SL1 and the projection light SL2 reflected by the turning mirror 23 reach. The projection light SL1 and the projection light SL2 having reached the concave surface 25A are reflected by the concave surface 25A and then outputted toward an upper side through an opening OP2 formed in the housing 11.

A control unit 27 is connected to the light source 13 to control an operation of changing the angle of the emitted light EL from the emitting unit 13A of the light source 13. The control unit 27 also generates an image to be projected onto the first screen 15 or the second screen 21, and sends image data (data of the image) to the light source 13. On the basis of this image data, the light source 13 emits the emitted light EL including the image from the emitting unit 13A.

The control for changes in the angle of the emitted light EL, which is performed by the control unit 27, and the image data generated by the control unit 27 can be varied on the basis of, for example, a state, in particular, a traveling state, of a mobile object, such as an automobile, equipped with the display device 30. Note that the angle of the optical axis AX of the emitted light EL can be changed among a plurality of fixed values or steplessly.

Note that an optical path length of the emitted light EL from the emitting unit 13A to the first screen 15 in the display device 30 is equal to an optical path length of the emitted light EL from the emitting unit 13A to the second screen 21 as with the display device 10.

When a laser light source capable of scanning by laser light, for example, is used as a light source, having the same distances between the light source and each of the screens allows laser beams irradiated onto the first screen 15 and the second screen 21 to have the same beam spot diameters.

When microlens arrays are used in the first screen 15 and the second screen 21, in particular, having the same beam spot diameters on the first screen 15 and the second screen 21 allows the first screen 15 and the second screen 21 to use the same microlens arrays. Thus, there is no need to design the first screen 15 and the second screen separately. Consequently, the production costs can be reduced.

Since a mode in which the display device 30 is used to display a virtual image via a windshield FG is the same as that described in the description of FIG. 1 in the aforementioned first embodiment, the description thereof will be omitted. The following description will be made with reference to FIG. 2 as needed.

Operations of Display Device

Figure 11:
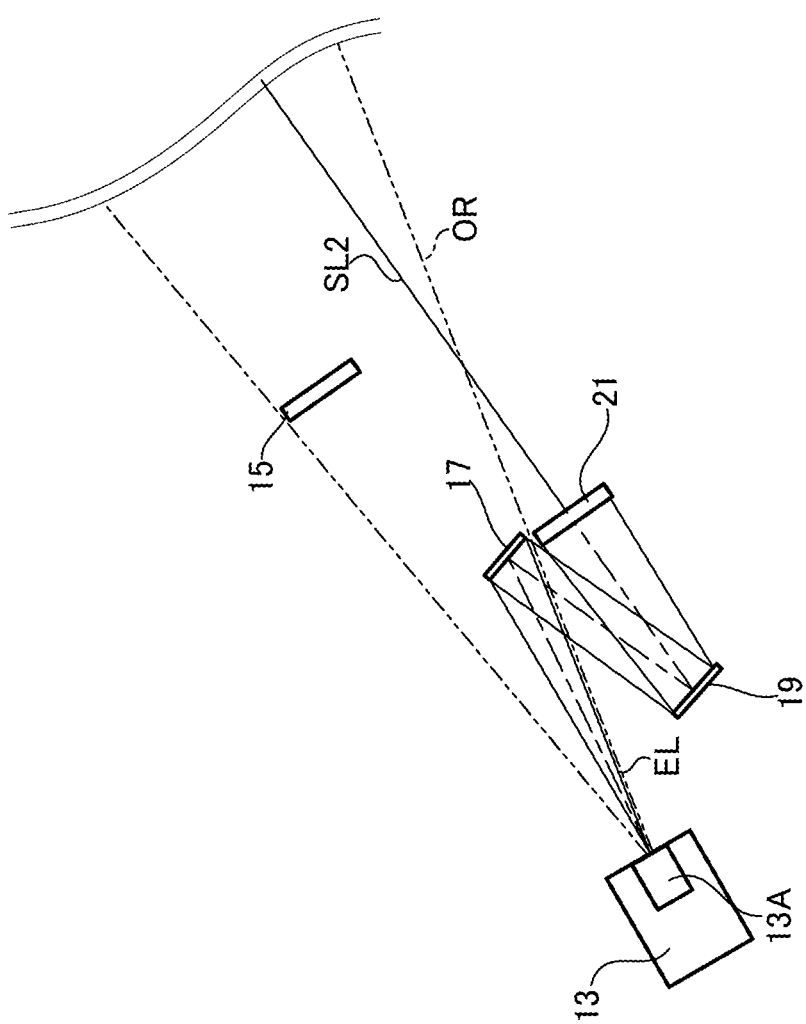
FIG. 11 shows an example of a mode of the arrangement of optical members in the display device according to the second embodiment.
Figure 12:
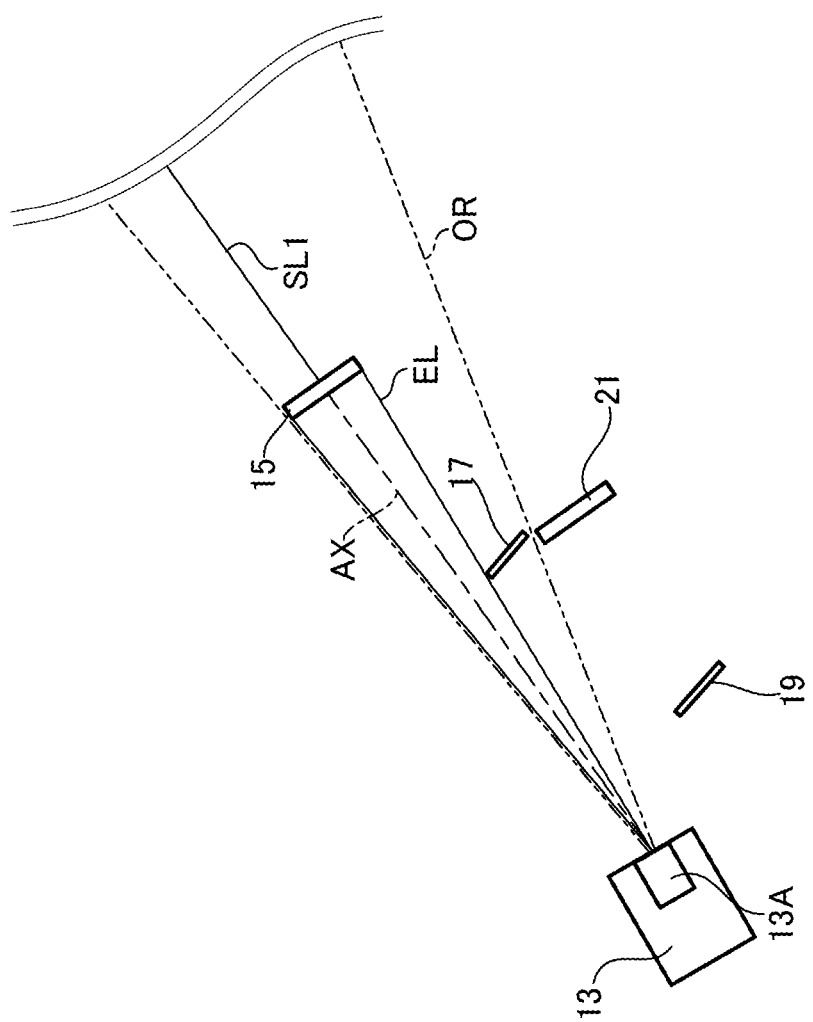
FIG. 12 shows an example of a mode of the arrangement of the optical members in the display device according to the second embodiment.
Figure 13:
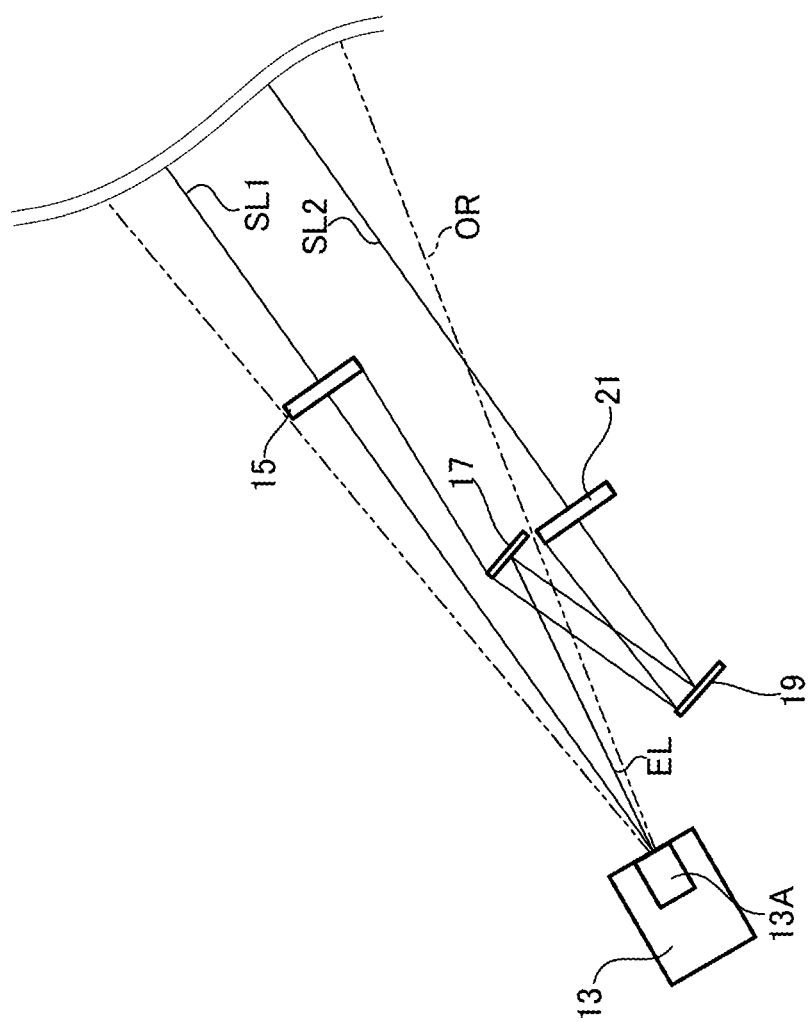
FIG. 13 shows an example of a mode of the arrangement of the optical members in the display device according to the second embodiment.

With reference to FIGS. 11 to 13, operating states of the display device 30 and display modes using virtual images in such operating states will be described below.

FIG. 11 is a diagram showing a mode of the arrangement of optical members including the light source 13, the first screen 15, the first reflecting mirror 17, the second reflecting mirror 19, and the second screen 21 as well as positional relationships between these members and the emitted light EL. FIG. 11 shows a case where the optical axis AX of the emitted light EL passes through the center of the first reflecting mirror 17, and all of the emitted light EL is reflected by the first reflecting mirror 17.

In this case, no emitted light EL reaches the first screen 15, and all of the emitted light EL reaches the second screen 21 to generate the projection light SL2 corresponding to the emitted light EL. Thus, no first virtual image VD1 of FIG. 2 is generated, and only the second virtual image VD2 is generated.

Since a mode of a virtual image appearing on the windshield when the optical axis AX of the emitted light EL passes through the center of the first reflecting mirror 17 and all of the emitted light EL is reflected by the first reflecting mirror 17 is the same as that in FIG. 4 described in the first embodiment, the description thereof will be omitted.

FIG. 12 is a diagram showing a mode of the arrangement of optical members including the light source 13, the first screen 15, the first reflecting mirror 17, the second reflecting mirror 19, and the second screen 21 as well as positional relationships between these members and the emitted light EL. FIG. 12 shows a case where the optical axis AX of the emitted light EL passes through the center of the first screen 15, and all of the emitted light EL is irradiated onto the first screen.

When the optical axis AX of the emitted light EL passes through the center of the first screen 15 and all of the emitted light EL is irradiated onto the first screen, no emitted light EL reaches the second screen 21, and only the projection light SL1 corresponding to the emitted light EL is generated. Thus, no second virtual image VD2 of FIG. 2 is generated, and only the first virtual image VD1 is generated.

Since a mode of a virtual image appearing on the windshield when the optical axis AX of the emitted light EL passes through the center of the first screen 15 and all of the emitted light EL is irradiated onto the first screen is the same as that in FIG. 6 described in the first embodiment, the description thereof will be omitted.

FIG. 13 is a diagram showing a mode of the arrangement of optical members including the light source 13, the first screen 15, the first reflecting mirror 17, the second reflecting mirror 19, and the second screen 21 as well as positional relationships between these members and the emitted light EL. FIG. 13 shows a case where the optical axis AX of the emitted light EL passes through the vicinity of the boundary between the first screen 15 and the first reflecting mirror 17 as viewed from the emitting unit 13A, and the emitted light EL is irradiated onto both of the first screen 15 and the first reflecting mirror.

When the optical axis AX of the emitted light EL passes through the vicinity of the boundary between the first screen 15 and the first reflecting mirror 17 as viewed from the emitting unit 13A, the lower half of the emitted light EL from the emitting unit 13A is reflected by the first reflecting mirror 17, and the upper half thereof reaches the first screen 15. That is, the lower half of the emitted light EL reaches the second screen 21.

Thus, the projection light SL1 corresponding to the upper half of the emitted light EL is generated by the first screen 15, and the projection light SL2 corresponding to the lower half of the emitted light EL is generated by the second screen 21. Thus, both of the first virtual image VD1 and the second virtual image VD2 in FIG. 2 are generated.

Since a mode of a virtual image appearing on the windshield when the optical axis AX of the emitted light EL passes through the vicinity of the boundary between the first screen 15 and the first reflecting mirror 17 as viewed from the emitting unit 13A is the same as that in FIG. 8 described in the first embodiment, the description thereof will be omitted.

As just described, the display device 30 can change a region where the two-dimensional display is provided by the first virtual image VD1 and a region where the AR display is provided by the second virtual image VD2 as needed by causing the first reflecting mirror 17 to slide. Thus, the display device 30 can display information in a flexible manner while changing a ratio between the two-dimensional display and the AR display with the simple mechanism and structure.

The aforementioned second embodiment has described the case where the emitting unit 13A is configured in such a manner that the optical axis AX of the emitted light EL is rotatable about the axis perpendicular to the plane of paper around the emitting unit 13A. The optical axis AX, however, may be rotatable about an axis parallel to the plane of paper in FIG. 10. This can change the position of the emitted light EL irradiated onto the first reflecting mirror 17 in the direction perpendicular to the plane of paper, and thus can change the position of the emitted light EL irradiated onto the second screen 21 in the direction perpendicular to the plane of paper. This can change the generation position of the second virtual image VD2 in the left or right direction (horizontal direction) in FIG. 4

The aforementioned first and second embodiments have been described taking, as an example, cases where the second screen 21 is fixed. The second screen 21, however, may be configured to be movable so as to be closer to, or away from, the turning mirror 23. This can bring the display position of the second virtual image VD2 closer to, or away from, the eyepoint EY. Specifically, the second screen 21 may be configured to be movable along the optical axis BX of the reflected light RL in the first embodiment or the optical axis of the emitted light EL in the second embodiment.

Figure 14:
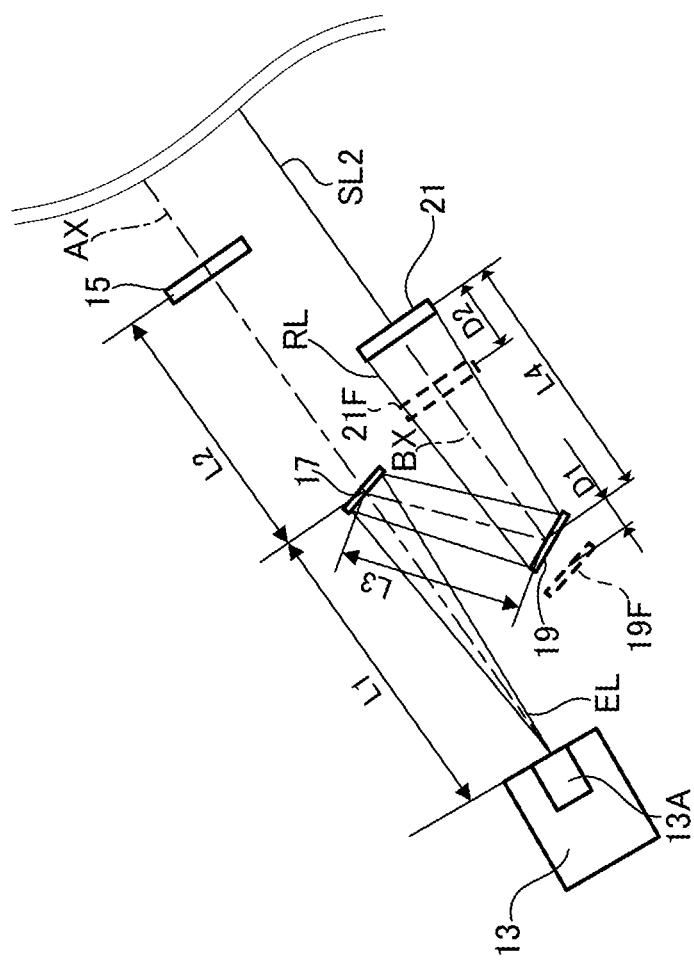
FIG. 14 shows an example of a mode of the arrangement of optical elements in a display device according to a modification example.

FIG. 14 shows an example of a mode of the arrangement of optical members in a modification example in which the second screen 21 in the display device 10 of the first embodiment is configured to be movable so as to be closer to the turning mirror 23 along the optical axis BX. In FIG. 14, the second reflecting mirror 19 and the second screen 21 before moved, which are shown in FIG. 3, are indicated by broken lines and denoted by reference numerals 19F and 21F, respectively.

As shown in FIG. 14, bringing the screen 21 closer to the turning mirror 23 can reduce the optical path length between the screen 21 and the windshield FG (see FIG. 2), thereby bringing the display position of the second virtual image VD2 closer to the eyepoint EY.

Moreover, the optical path length from the emitting unit 13A of the light source 13 to the second screen 21 is preferably kept constant by moving the second reflecting mirror 19 along with the movement of the second screen 21 as shown in FIG. 14. That is, the second reflecting mirror 19 is preferably moved so as not to change the optical path length L1+L3+L4. When the optical path length is kept constant, a moving distance D1 of the second reflecting mirror 19 may be set to about ½ of a moving distance D2 of the second screen 21.

This allows the spot diameter of laser light irradiated onto the second screen 21 to be kept constant even when the second screen 21 is moved for a case where a laser projector device is used as the light source 13, for example. Consequently, the second virtual image VD2 can be kept in an excellent display state.

Moreover, the first mirror 17 and the second mirror 19 are preferably configured in such a manner that the orientations thereof can be changed appropriately to guide the emitted light EL from the light source 13 to the second screen 21. For example, the first mirror 17 and the second mirror 19 are preferably configured to be rotatable about an axis perpendicular to the plane of paper in FIG. 14.

In the aforementioned embodiments, the optical path length from the emitting unit 13A to the first screen 15 and the optical path length from the emitting unit 13A to the second screen 21 are set equal to each other. These optical path lengths, however, may not necessarily be the same.

Although the aforementioned embodiments have been described taking, as an example, the cases where the light source 13 is a laser projector, the light source 13 may be a light source comprising a digital light processing (DLP) projector using a digital mirror device (DMD). Alternatively, the light source 13 may be a light source comprising a liquid crystal projector.

In the first and second embodiments described above, the first virtual image VD1 and the second virtual image VD2 are displayed in a display mode corresponding to a state of the ego vehicle. The control unit 27, however, may change a display mode depending on a position of the ego vehicle.

More specifically, the control unit 27 may change a display mode by acquiring the current position of the ego vehicle equipped with the display device 10 via a GPS device (not shown), for example, and controlling the movement of the first mirror 17 on the basis of the acquired current position. That is, the control unit 27 may acquire, as a positional information acquisition unit, positional information indicating the current position of the ego vehicle, and the control unit 27 may control the first mirror 17 on the basis of the positional information.

In this case, the control unit 27 may include, for example, a storage unit having a mode information table containing spots on a map and display modes of the display device 10 set for those spots. For example, the danger state display mode described in the first embodiment may be set corresponding to a spot at which the ego vehicle is more likely to be in a danger state, such as a heavily trafficked spot or a blind intersection.

More specifically, in order to facilitate the notification of a danger to the driver when the ego vehicle approaches the spot at which the ego vehicle is more likely to be in a danger state, the AR display provided by the second virtual image VD2 may be set to be performed in a display mode using the entire display region DR2 as shown in FIG. 4.

The control unit 27 may include, for example, a storage unit that stores environmental information indicating surrounding environment for each position, such as a heavily trafficked spot or a blind intersection. In this case, the control unit 27 may acquire, on the basis of the position of the ego vehicle and its environmental information, the surrounding environment of the current position at the current position of the ego vehicle, and switch a display mode on the basis of the acquired surrounding environment. This allows for smooth switching among the display modes in accordance with the surrounding conditions.

Note that the aforementioned mode information table and environmental information may be stored in an external server capable of communicating with the control unit 27. In this case, the control unit 27 of the display device 10 may, for example, communicate with the external server via wireless communication, or the like, using a communication unit (not shown) to access the mode information table or the environmental information, and change a display mode on the basis of the table or the environmental information and the position of the ego vehicle.

Alternatively, the mode information table may contain, instead of the display modes of the display device 10 set for the spots on the map, control information on the movements of the first mirror 17 for obtaining these display modes. In this case, the control unit 27 may acquire the current position of the ego vehicle, retrieve and acquire control information of the first mirror from the mode information table on the basis of the current position of the ego vehicle, and control the movement of the first mirror 17 according to the control information.

More specifically, the control unit 27 may acquire, as a positional information acquisition unit, positional information indicating information on the current position of the ego vehicle, acquire, as a control information acquisition unit, control information, for example, by retrieving the control information of the first mirror from the mode information table on the basis of the current position of the ego vehicle, and control the movement of the first mirror 17 according to the control information.

Although the aforementioned embodiments have been described taking, as an example, the cases where the first screen 15 and the second screen 21 are transmissive screens, at least one of these screens may be a reflective screen.

Figure 15:
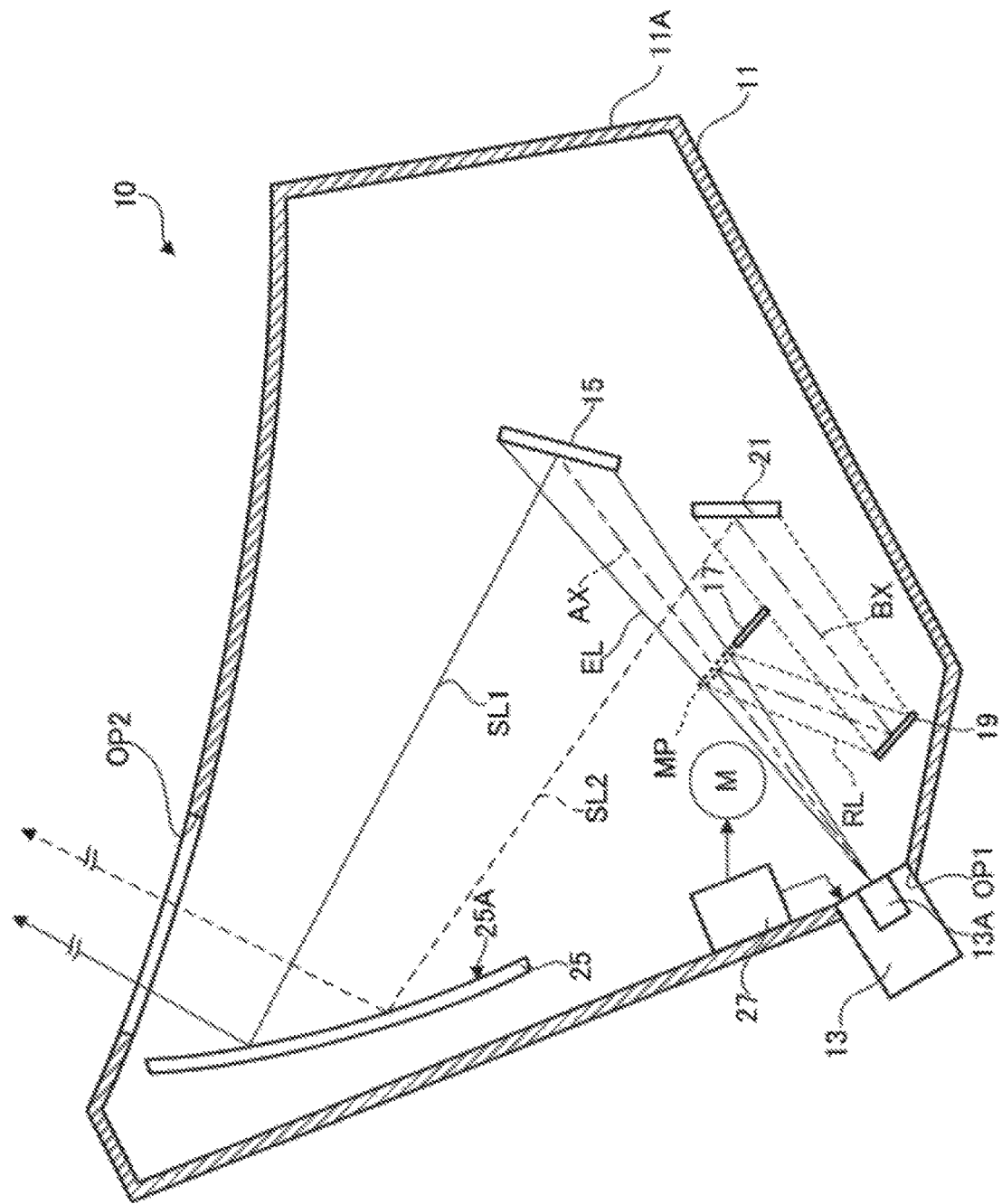
FIG. 15 is a cross-sectional view of a display device according to a modification example.

FIG. 15 is a cross-sectional view of the display device 10 according to a modification example in which the first screen 15 and the second screen 21 are reflective screens. When the first screen 15 and the second screen 21 are reflective screens as shown in FIG. 15, the emitted light EL that has reached the first screen 15 and the reflected light RL that has reached the second screen 21 are reflected toward the concave mirror 25 by the first screen 15 and the second screen 21, respectively. Thus, the turning mirror 23 described in the aforementioned embodiments is unneeded in this case.

Various configurations and the like in the above-described embodiments are provided by way of example only, and can be selected as appropriate depending on its use application and the like.

REFERENCE SIGNS LIST 10, 30 display device
11 housing 13 light source
15 first screen
17 first reflecting mirror
19 second reflecting mirror
21 second screen
23 turning mirror
25 concave mirror
27 control unit
PM display member

The invention claimed is:

1. A display device including:
 a light source configured to emit light within a predetermined irradiation region;
 a first screen at least partially located in said irradiation region;
 a first reflective unit movable to enter a part of said irradiation region located between said light source and said first screen, from outside said irradiation region;
 a second reflective unit disposed at a position where the light reflected by said first reflective unit reaches; and
 a second screen disposed at a position where the light reflected by said second reflective unit reaches.

2. The display device according to claim 1, wherein said first screen and said second screen are spaced apart from each other in a direction perpendicular to the optical axis of the light emitted from said light source.

3. The display device according to claim 2, wherein an optical path length of the light between said light source and said first screen is equal to an optical path length of the light between said light source and the second screen.

4. The display device according to claim 3, wherein said second screen is movable along the optical axis of the light emitted from said light source.

5. The display device according to claim 4, wherein said second reflective unit is movable along the optical axis of the light emitted from said light source.

6. The display device according to claim 5, wherein said second screen and second reflective unit are configured to move so as to maintain a state where an optical path length of the light between said light source and said second screen via said first reflective unit and said second reflective unit is equal to a optical path length of the light between said light source and said first screen.

7. The display device according to claim 1, wherein said second screen is disposed on the side toward which the light is radiated as viewed from said light source.

8. The display device according to claim 1, further comprising a positional information acquisition unit configured to acquire positional information which indicate a current position of a vehicle on which said display device is mounted and a control unit configured to control movement of said first reflective unit based on the acquired current position.

9. A display device including:
 a light source configured to emit light in a first direction to irradiate a first region and in a second direction to irradiate a second region separate from the first region in a manner capable of changing an emission direction between the first direction and the second direction;
 a first screen at least partially located in said first region;
 a first reflective unit at least partially located in the second region, outside of the first region, and disposed at a position closer to said light source than said first screen;
 a second reflective unit disposed at a position where the light reflected by said first reflective unit reaches; and
 a second screen disposed at a position where the light reflected by said second reflective unit reaches.

\* \* \* \* \*